(12) United States Patent
Takaie

(10) Patent No.: US 8,891,077 B2
(45) Date of Patent: Nov. 18, 2014

(54) SHACK-HARTMANN SENSOR AND WAVEFRONT MEASURING METHOD UTILIZING THE SAME

(71) Applicant: Canon Kabushiki Kaisha, Tokyo (JP)

(72) Inventor: Yuuichi Takaie, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/963,220

(22) Filed: Aug. 9, 2013

(65) Prior Publication Data

US 2014/0043599 A1      Feb. 13, 2014

(30) Foreign Application Priority Data

Aug. 10, 2012  (JP) ................. 2012-179029

(51) Int. Cl.
*G01J 9/00*        (2006.01)
(52) U.S. Cl.
CPC .................................. *G01J 9/00* (2013.01)
USPC ......................... 356/121; 356/122; 356/123
(58) Field of Classification Search
CPC ........................................................ G01J 9/00
USPC .............. 356/212–123, 121–123; 250/201.9, 250/201.2, 208.1
See application file for complete search history.

(56) References Cited

U.S. PATENT DOCUMENTS

| | | | | |
|---|---|---|---|---|
| 4,725,138 A | * | 2/1988 | Wirth et al. | ..... 356/121 |
| 5,629,765 A | * | 5/1997 | Schmutz | ..... 356/121 |
| 5,825,476 A | * | 10/1998 | Abitol et al. | ..... 356/124 |
| 6,052,180 A | * | 4/2000 | Neal et al. | ..... 356/121 |
| 6,376,819 B1 | * | 4/2002 | Neal et al. | ..... 250/201.9 |
| 6,563,947 B1 | * | 5/2003 | Droste | ..... 382/181 |
| 6,750,957 B1 | | 6/2004 | Levecq et al. | |
| 7,122,774 B2 | * | 10/2006 | Topa | ..... 250/201.2 |
| 7,301,613 B2 | * | 11/2007 | Levecq et al. | ..... 356/121 |
| 8,158,917 B2 | * | 4/2012 | Li et al. | ..... 250/201.9 |
| 8,583,757 B2 | * | 11/2013 | Takaoka et al. | ..... 709/213 |
| 2007/0247698 A1 | * | 10/2007 | Yoon | ..... 359/277 |

FOREIGN PATENT DOCUMENTS

| | | |
|---|---|---|
| JP | 09-015057 A | 1/1997 |
| JP | 11-211562 A | 8/1999 |
| JP | 2002-535608 A | 10/2002 |

* cited by examiner

*Primary Examiner* — Sang Nguyen

(74) *Attorney, Agent, or Firm* — Rossi, Kimms & McDowell LLP

(57) ABSTRACT

A wavefront measuring method using a Shack-Hartmann sensor includes the steps of provisionally determining one of a plurality of light receiving elements as a center-of-gravity position in a spot having a light intensity distribution of light condensed on the light receiving element, calculating a distance between the provisionally determined center-of-gravity position and an adjacent center-of-gravity position, setting an area smaller than and inside of a spot that partially overlaps another spot, and setting a spot that does not overlap another spot to the area, calculating a center-of-gravity position for each area, and calculating the wavefront based upon a shift amount between an ideal center-of-gravity position when parallel light enters the micro lens array and the center-of-gravity position of each area.

10 Claims, 7 Drawing Sheets

SHACK-HARTMANN SENSOR AND WAVEFRONT MEASURING METHOD UTILIZING THE SAME

BACKGROUND OF THE INVENTION

1. Field of the Invention

The present invention relates to a Shack-Hartmann sensor and a wavefront measuring method utilizing the same.

2. Description of the Related Art

A Shack-Hartmann sensor includes a micro lens array in which many micro condenser lenses are arranged in a lattice shape, and light receiving sensors such as CCDs, and light incident upon each micro lens condenses and forms a spot on a light receiving sensor. Herein, the "spot" has an intensity distribution of light that is condensed on the light receiving sensor by each micro lens. A center-of-gravity ("CoG") position of the spot shifts due to a wavefront slope incident upon the micro lens array when the light is condensed, the wavefront slope is calculated based upon a CoG position shift amount of the spot, and a two-dimensional phase distribution can be calculated based upon the wavefront slope.

Each of Japanese Patent Laid-Open No. 9-15057 and Japanese Patent Domestic Publication No. 2002-535608 discloses a method for measuring a large wavefront aberration using a Shack-Hartmann sensor. In the large wavefront aberration, a local wavefront slope is steep and thus a positional shift amount of the spot increases. These methods enlarge a dynamic range by characterizing light that transmits one or more micro lenses and by correlating each micro lens with the spot. Japanese Patent Laid-Open No. 11-211562 discloses another illustrative wavefront measuring method.

When the large wavefront aberration is measured by the Shack-Hartmann sensor, due to the steep local wavefront slope and a large slope variation amount, a distance reduces between the CoG positions of the spots made by the light condensed by each micro lens. According to the above methods, even when each micro lens is correlated with the spot, as the distance between the CoG positions reduces the CoG position detecting precision lowers and finally the wavefront measuring precision lowers due to the crosstalk.

SUMMARY OF THE INVENTION

The present invention provides a Shack-Hartmann sensor and a wavefront measuring method utilizing the same, which can prevent a drop of the wavefront measuring precision.

A wavefront measuring method according to the present invention is configured to measure a wavefront of a target optical system using a Shack-Hartmann sensor having a micro lens array and a plurality of light receiving elements. The micro lens array has a two-dimensional arrangement and includes a plurality of micro lenses configured to condense light that has passed the target optical system upon the light receiving elements. The wavefront measuring method includes the steps of provisionally determining one of the plurality of light receiving elements as a center-of-gravity position in a spot having a light intensity distribution of light condensed on the light receiving element, calculating a distance between the provisionally determined center-of-gravity position and an adjacent center-of-gravity position, setting an area smaller than and inside of a spot that partially overlaps another spot, and setting a spot that does not overlap another spot to the area, calculating a center-of-gravity position for each area, and calculating the wavefront based upon a shift amount between an ideal center-of-gravity position when parallel light enters the micro lens array and the center-of-gravity position of each area.

Further features of the present invention will become apparent from the following description of exemplary embodiments with reference to the attached drawings.

DESCRIPTION OF THE EMBODIMENTS

Figure 1:
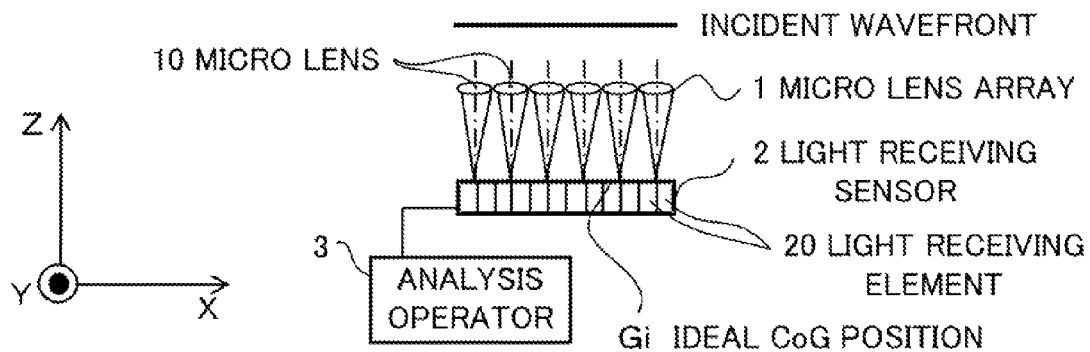
FIG. 1 is a schematic sectional diagram when a plane wave is measured by a Shack-Hartmann sensor.
Figure 2:
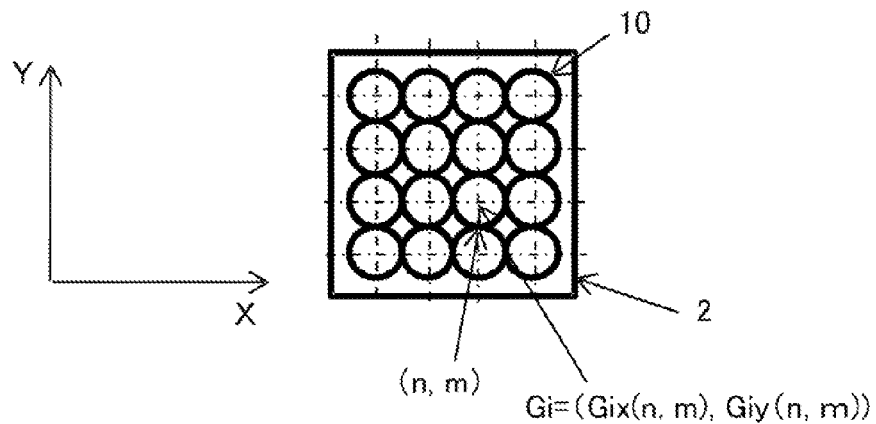
FIG. 2 is a top view of the micro lens array and light receiving sensor illustrated in FIG. 1.

This embodiment relates to a Shack-Hartmann sensor and a wavefront measuring method configured to measure a wavefront of a target optical system using the Shack-Hartmann sensor. FIG. 1 is a schematically sectional view when the Shack-Hartmann sensor measures a plane wave that has passed the target optical system. The Shack-Hartmann sensor includes a micro lens array 1, a light receiving sensor 2, and an analysis operator 3. FIG. 2 is a top view of the micro lens array 1 and the light receiving sensor 2.

Light that has passed the target optical system enters the micro lens array 1, and the micro lens array illustrated in FIG. 1 receives parallel light. As illustrated in FIG. 2, the micro lens array includes a plurality of two-dimensionally arranged micro lenses 10. FIG. 2 illustrates the micro lens array 1 that includes 4×4 micro lenses 10, but the number is not limited and N×M micro lenses (where N and M are integers) are acceptable.

Figure 4:
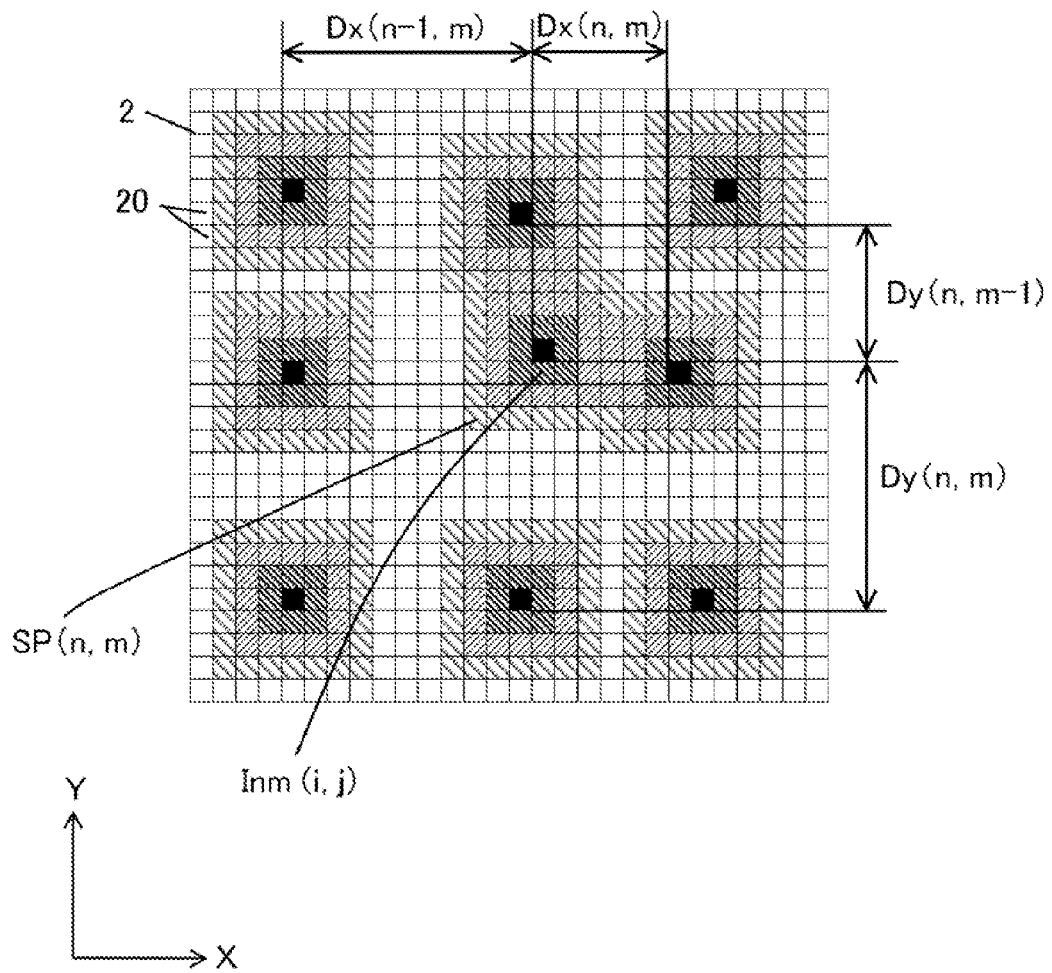
FIG. 4 is a plane view of an intensity distribution on each light receiving sensor illustrated in FIG. 1.

The light receiving sensor 2 includes, as illustrated in FIG. 4, which will be describe later, a plurality of two-dimensionally arranged light receiving elements 20, and each light receiving element 20 constitutes a pixel. An output from the light receiving sensor 2 is supplied to the analysis operator 3 through the A/D converter and signal processor (not illustrated).

In FIG. 1, the micro lens array 1 condenses parallel incident light on the light receiving sensor 2. The center of gravity ("CoG") position of the spot of the parallel incident light upon the micro lens array 1 is set to an ideal CoG position Gi. As illustrated in FIG. 2, assume the two-dimensional arrangement directions of the micro lens array 1 are an X direction (first direction) and a Y direction (second direction orthogonal to the first direction). The number of each micro lens 10 in the X direction is expressed by n and the number of each micro lens 10 in the Y direction is expressed by m. The ideal CoG position on the surface of the light receiving sensor 2 of each micro lens 10 is Gix(n, m), Giy(n, m). Herein, n is an integer from 1 to N, m is an integer from 1 to M, Gix is an X-directional CoG position of the spot, and Giy is a Y-directional CoG position of the spot. This information is previously stored in a memory (storage) (not illustrated).

Figure 3:
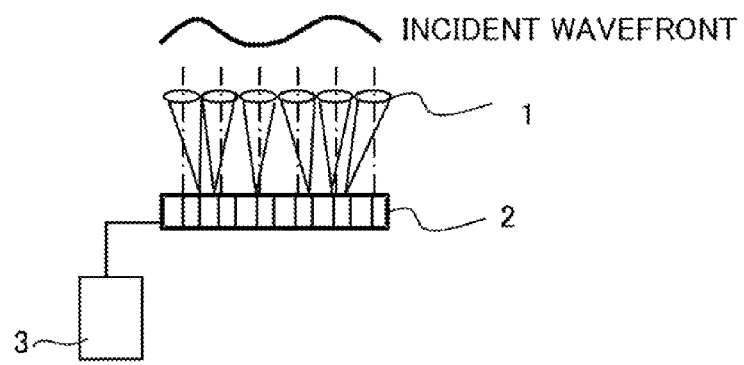
FIG. 3 is a schematic sectional view when the Shack-Hartmann sensor measures an aberrational wavefront.

FIG. 3 is a schematic sectional view of the aberrational wavefront that has passed the target optical system and enters the micro lens array 1. As illustrated in FIG. 3, as the wavefront inclines, the CoG position of the spot shifts from the ideal CoG position Gi when the light is condensed on the light receiving sensor 2.

FIG. 4 illustrates that a plurality of square light receiving elements (pixels) 20 are arranged on the light receiving sensor 2. The incident wavefront is condensed by the micro lens array 1 and forms spots SP(n, m) on the light receiving sensor 2. In FIG. 4, the black and hatched part expresses a spot SP(n, m) and the color depth illustrates the light intensity. In FIG. 4, a square shape illustrates the intensity of the light receiving sensor 2 corresponding to the micro lens 10 but the present invention is not limited to this embodiment, and may use a shape close to a circle, such as a regular hexagon and a regular octagon.

In FIG. 4, assume that the lower left spot is SP(1, 1). Then, it is understood that SP(2, 3) and SP(2, 2) partially overlap each other and SP(2, 2) and SP(3, 2) partially overlap each other. In other words, SP(2, 2) contains wavefront information of SP(2, 3) and SP(3, 2), SP(3, 2) contains wavefront information of SP(2, 2). Thus, when the analysis operator 3 calculates each wavefront using the information of SP(2, 3), SP(2, 2) and SP(3, 2), the calculated wavefront contains unnecessary information and the wavefront measuring precision lowers. As illustrated in FIG. 4, a plurality of partially overlapping spots may occur due to manufacture errors, but this is likely to occur when the target optical system is an aspheric lens.

Accordingly, the embodiments of the present invention reduce or eliminate the overlapping of the spots so as to maintain the wavefront measuring precision even in the state illustrated in FIG. 4.

First Embodiment

Figure 5:
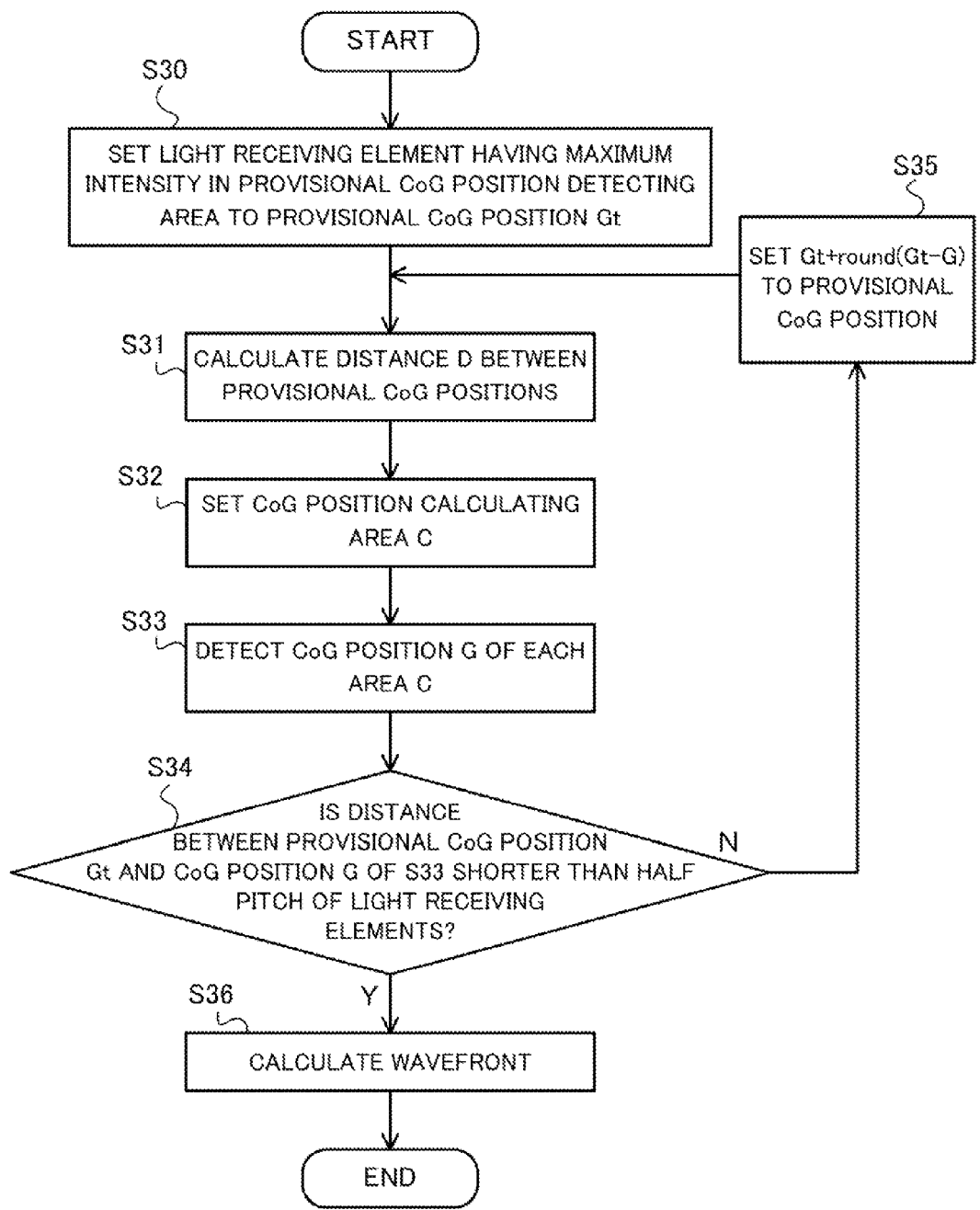
FIG. 5 is a flowchart of a wavefront measuring method according to a first embodiment of the present invention.

FIG. 5 is a flowchart of a wavefront measuring method according to a first embodiment, which is executed by the analysis operator 3. "S" stands for the step. The analysis operator 3 can be comprised of a microcomputer (processor), and the wavefront measuring method illustrated in FIG. 5 can be implemented as a program that enables the computer to execute each step. This is true of other embodiments.

Initially, the analysis operator 3 sets one of the plurality of light receiving elements to the provisional CoG position Gt in the spot SP(n, m) as the light intensity distribution of the light condensed on the light receiving element 20 (S30). First, an area used to detect the provisional CoG position Gt is set. One method sets the area to a rectangular area enclosed by a pitch P of the micro lenses 10 with the ideal CoG position Gi as a center, and another method sets a detecting area a light receiving element having an intensity equal to or larger than a threshold. Next, the light receiving element 20 having the maximum intensity (peak) is detected in the area used to detect the provisional CoG position. Assume that "i" denotes a number of each light receiving element in the X direction, "j" denotes a number of each light receiving element in the Y direction, and Inm(i, j) denotes a light intensity of the light receiving element (i, j). In the area used to detect the provisional CoG position, the light receiving element 20 that has the maximum intensity is set to the provisional CoG position Gt of the spot SP(n, m).

Next, the analysis operator 3 calculates a distance D between two adjacent CoG positions in the two-dimensional direction calculated in S30 (S31). For example, distances D between the provisional CoG position (center black part in FIG. 4) of the spot SP(2, 2) and each of the adjacent four CoG positions are calculated in each of the X and Y directions as Dx(n, m), Dx(n−1, m), Dy(n, m), and Dy(n−1, m). This operation is performed for all spots.

Figure 6:
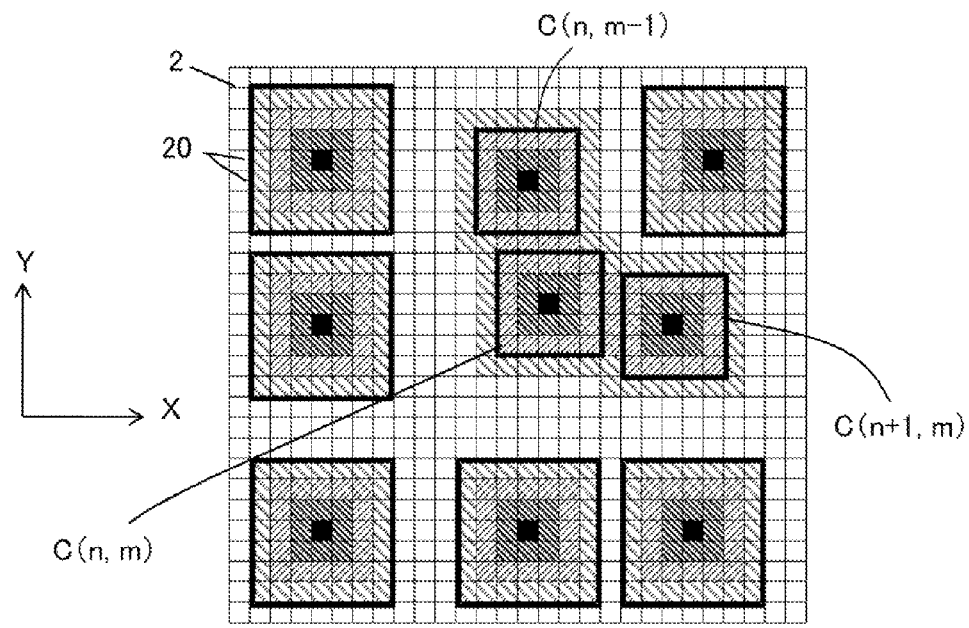
FIG. 6 is a plane view of an area which is set by S32 in FIG. 5, and used to calculate a center of gravity position according to the first and second embodiments.

Next, the analysis operator 3 sets, as illustrated in FIG. 6, an area C(n, m) used to detect the CoG position for each spot (S32). For the spot that partially overlaps another spot, the analysis operator 3 sets the area smaller than the spot and inside the spot. On the other hand, for the spot that does not partially overlap another spot, the analysis operator 3 sets the spot to the area.

Initially, The analysis operator 3 extracts a minimum value among Dx(n, m), Dx(n−1, m), Dy(n, m), and Dy(n−1, m). In FIG. 4, Dx(n, m) (or Dy(n, m)) is the minimum. Next, the provisional CoG position as illustrated in FIG. 6 is set to the center. When the number of light receiving elements of Dx(n, m) is even, then a rectangular area C(n, m) enclosed by Dx(n, m)−1 is set, and when the number of light receiving elements of Dx(n, m) is odd, then a rectangular area C(n, m) enclosed by Dx(n, m) is set. For example, in FIG. 4, there are six light receiving elements of Dx(n, m), and thus five light receiving elements are set to one side for the partially overlapping spots SP(2, 3), SP(2, 2), and SP(3, 2) in FIG. 6. The odd number is used to specify the center pixel (light receiving element). Thus, the area C has a length equal to or shorter than the distance D.

Figure 7:
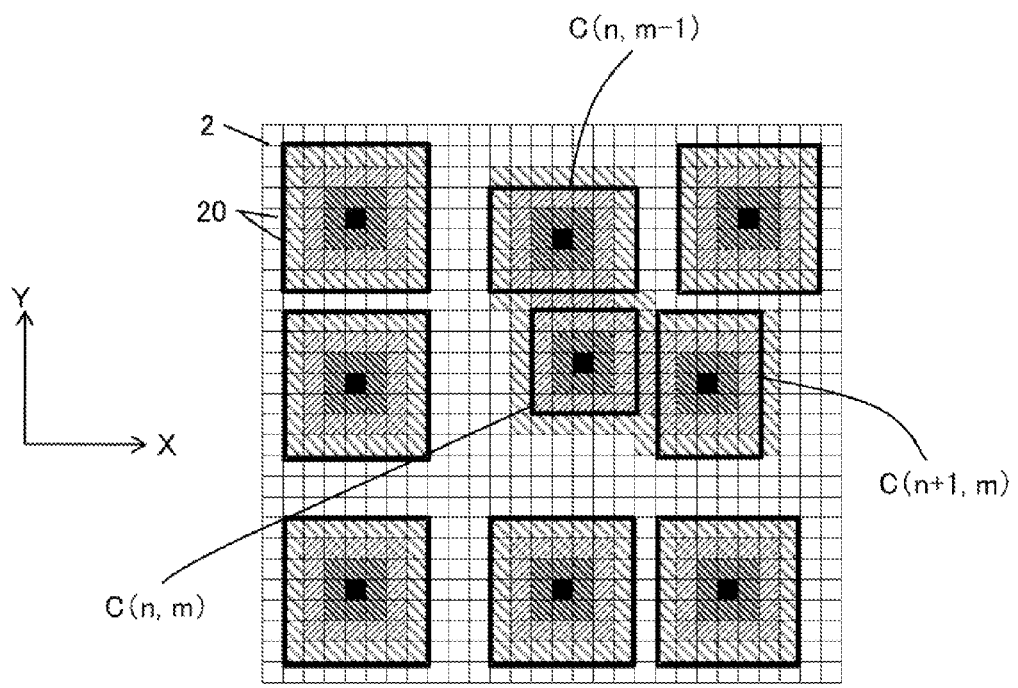
FIG. 7 is a plane view of a variation of FIG. 6 according to the first and second embodiments.

FIG. 6 uses the same value (Dx(n, m)) for the X and Y directions, but Dx(n, m) and Dy(n, m) may be set in the X and Y directions, respectively. Then, as illustrated in FIG. 7, the area C(n, m) is a square but the area C(n+1, m) and C(n, m−1) are rectangles. Individual setting of the areas in the X and Y directions enables optimal CoG positions to be detected in each of the X and Y directions.

Figure 8:
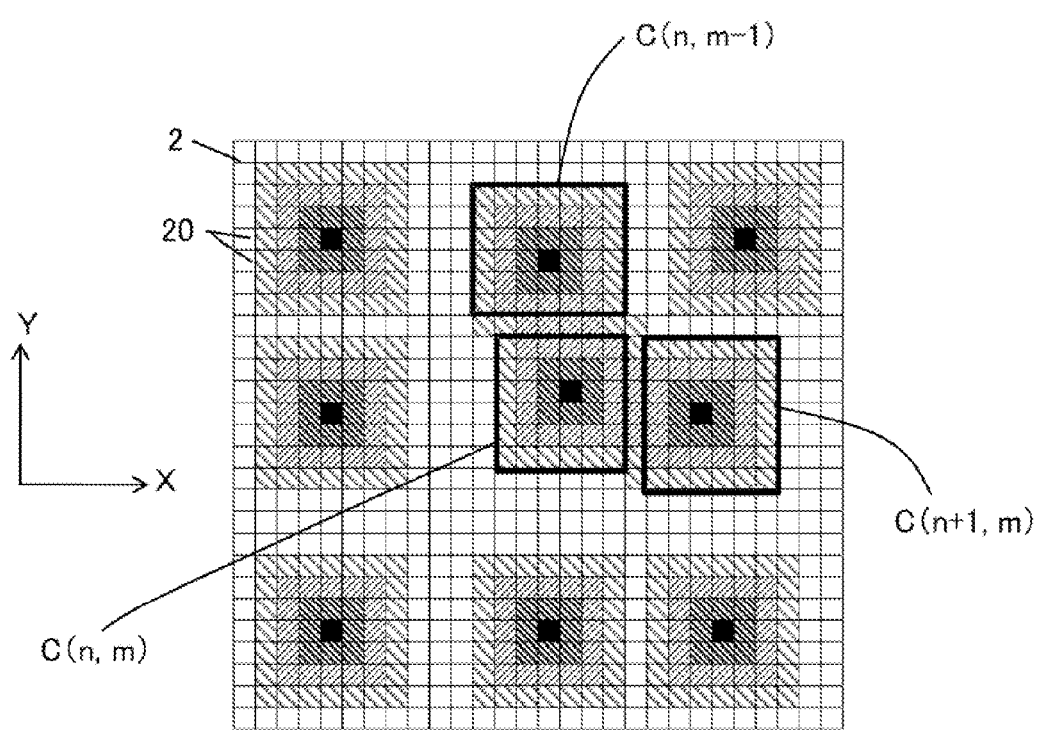
FIG. 8 is another plane view of another variation of FIG. 6 according to the first and second embodiments.

In addition, the area C is unnecessarily symmetrical in the lateral direction with respect to the provisional CoG position as a center. As illustrated in FIG. 8, the area may be segmented in accordance with the distance between the adjacent provisional CoG positions. By securing the area C as large as possible in a range in which there is no crosstalk, a CoG position can be detected in a noise resistant manner.

Next, the analysis operator 3 detects a CoG position G of the area C set in S32 using the following expressions (S33). P may be a real number equal to or larger than 1. P is 1 in the general CoG position detections, but when P is set to 2 or larger, the CoG position can be detected in a noise resistant manner.

$$Gx(n, m) = \frac{\sum_i \sum_j i \cdot Inm(i, j)^P}{\sum_i \sum_j (Inm(i, j))^P} \quad (1)$$

$$Gy(n, m) = \frac{\sum_i \sum_j j \cdot Inm(i, j)^P}{\sum_i \sum_j (Inm(i, j))^P} \quad (2)$$

Next, the analysis operator 3 compares the CoG position Gt provisionally determined by S30 with the CoG position G calculated by Expressions 1 and 2 in S33 (S34). When a distance (|Gt−G|) between the provisional CoG position and the CoG position calculated by Expressions 1 and 2 is equal to or shorter than half a pitch of the light receiving elements 20 (Y of S34), the flow moves to a wavefront measuring step S36.

On the other hand, when |Gt−G| is longer than half a pitch of the light receiving elements 20 (N of S34), the analysis operator 3 updates the provisional CoG position with Gt+round(Gt−G) based upon the provisional CoG position Gt decided by S30 and the CoG position G calculated by S33 (S35). Herein, "round" represents rounding off of the first decimal place. When the precision of the provisional CoG position is equal to or longer than half a pitch of the light receiving elements 20, the precision of the provisional CoG position can be made equal to or shorter than half a pitch of the light receiving elements 20 by the flow returning from S35 to S31. When the precision of the provisional CoG position improves, the precision of the CoG position G calculated by Expressions 1 and 2 improves.

Since the distance between the provisional CoG positions changes by about one pitch, the distance between the provisional CoG positions is not recalculated, and S32 may be performed after S35. By performing processing subsequent to S32 immediately, the CoG can be detected quickly. Instead of updating the provisional CoG position in S35, the shape of the area C may be updated. For example, as described above, the shape may be made rectangular, or the CoG may be shifted from the center. Of course, the area C may not be a square or a rectangle, and may have a shape close to a circle, such as an octagon or a hexagon.

As described above, the CoG position can be highly precisely detected by setting the area C in accordance with the distance D between the provisional CoG positions.

When the distance (|Gt−G|) between the provisional CoG position and the CoG position is equal to or smaller than half a pitch of the light receiving elements 20 (Y of S34), the analysis operator 3 calculates the wavefront W(X,Y) incident upon the micro lens array 1 (S36). Initially, the analysis operator 3 calculates the CoG position G(n, m) of the spot SP(n, m). Next, a shift amount ΔG(n, m) of the CoG position G(n, m) from the ideal CoG position Gi(n, m) is calculated as follows:

$$\Delta Gx(n,m) = Gx(n,m) - Gix(n,m) \tag{3}$$

$$\Delta Gy(n,m) = Gy(n,m) - Giy(n,m) \tag{4}$$

Assume that dW(n, m)/dX is an average slope of the X-directional wavefront and dW(n, m)/dY is an average slope of the Y-directional wavefront, incident upon the micro lens at (n, m). Then, they can be calculated as follows using a shift amount ΔG(n, m) from the ideal CoG position and a focal length L of the micro lens array 1:

$$\frac{dW(n,m)}{dX} = \tan^{-1}\left(\frac{\Delta Gx(n,m)}{L}\right) \tag{5}$$

$$\frac{dW(n,m)}{dX} = \tan^{-1}\left(\frac{\Delta Gy(n,m)}{L}\right) \tag{6}$$

The analysis operator 3 can calculate the wavefront W(X, Y) incident upon the micro lens array 1 by integrating Expression 5 and 6.

It is understood from Expressions 5 and 6 that in order to precisely measure the wavefront, it is necessary to precisely calculate ΔG, and it is necessary to precisely detect the CoG position G of the spot SP. This embodiment satisfies these conditions.

This embodiment sets the area C used to calculate the CoG position using the distance D between two adjacent CoG positions. The area C is smaller than the spot when the spot overlaps another spot, and the overlapping area reduces. In this embodiment, as illustrated in FIG. 6, the areas C(n, m−1), C(n, m), and C(n+1, m) are set in the partially overlapping spots SP(2, 3), SP(2, 2), and SP(3, 2), respectively, and the overlapping region of the area C is eliminated. Hence, when the wavefront is calculated based upon the area C, the crosstalk can be reduced for the partially overlapping spot, and the wavefront measuring precision and the dynamic range can be maintained. The optimal CoG position can be detected in each of the X and Y directions by individually setting the area C in the X and Y directions.

Second Embodiment

The first embodiment sets the light receiving element 20 having the maximum intensity in the provisional CoG position detecting area to the provisional CoG position of the spot in S30, whereas this embodiment determines the provisional CoG position based upon an operation using a design value of the optical system and thus is different from the first embodiment.

Figure 9:
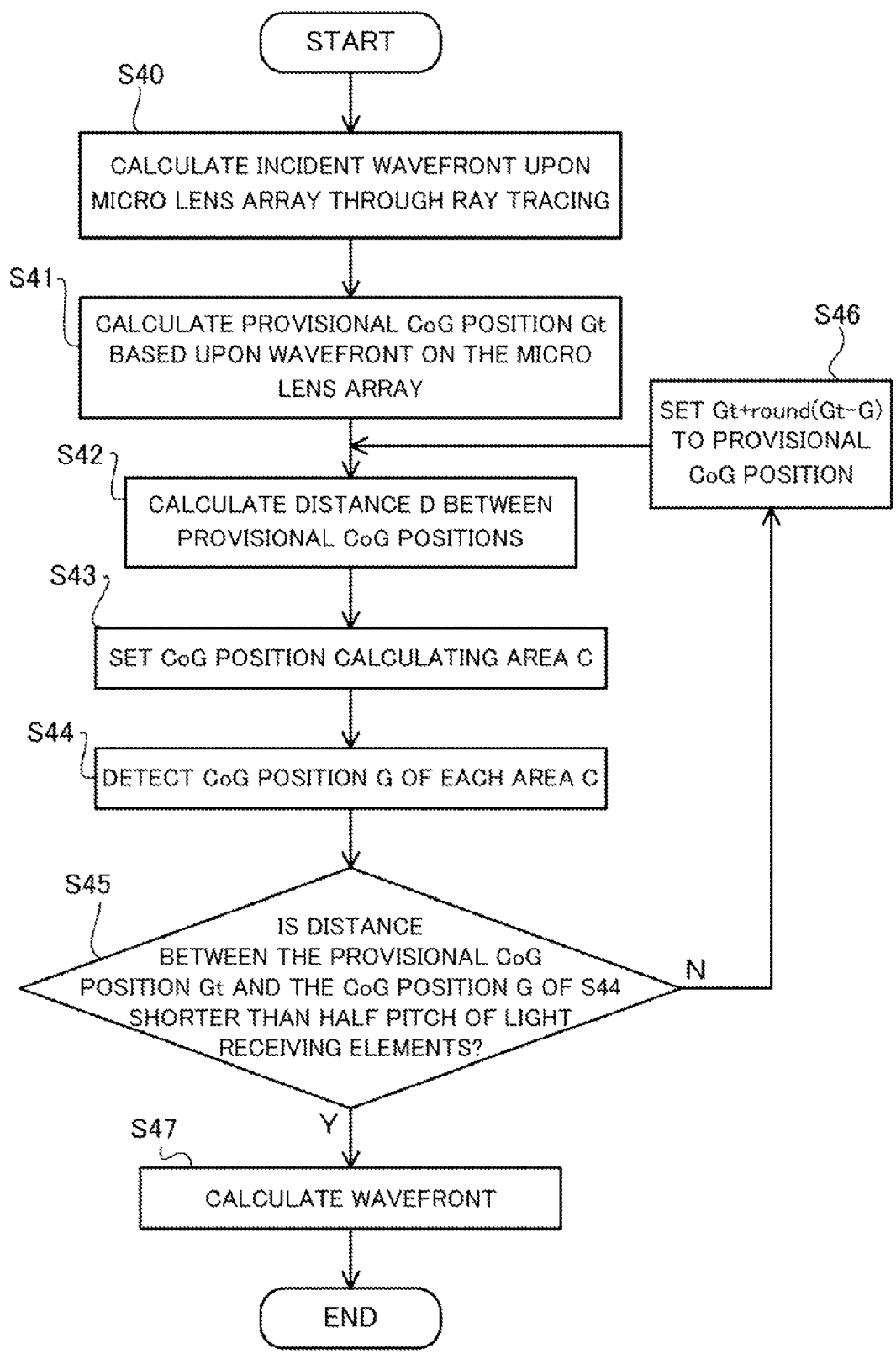
FIG. 9 is a flowchart of a wavefront measuring method according to the second embodiment of the present invention.

FIG. 9 is a flowchart of a wavefront measuring method of this embodiment which is executed by the analysis operator 3, and "S" stands for the step.

Initially, the analysis operator 3 calculates the incident wavefront upon the micro lens array 1 (S40). The incident wavefront upon the micro lens array 1 is calculated using a method, such as a design value of the target optical system and ray tracing.

Next, the analysis operator 3 determines the provisional CoG position based upon the incident wavefront upon the micro lens array 1 (S41). Where dW(n, m)/dX and dW(n, m)/dY are slopes of the wavefront incident upon each micro lens array 1, shift amounts ΔGx(n, m) and Δ Gy(n, m) from the ideal CoG position are expressed as follows:

$$\Delta Gx(n,m) = L \cdot \tan\{dW(n,m)/dX\} \tag{7}$$

$$\Delta Gy(n,m) = L \cdot \tan\{dW(n,m)/dY\} \tag{8}$$

Since the ideal CoG position coordinate is expressed by (Gix(n, m), Giy(n, m)), the provisional CoG position Gt can be set to (Gix(n, m)+ΔGx(n, m), Giy(n, m)+ΔGy(n, m)).

S42 to S47 are similar to S31 to S36.

This embodiment can determine the provisional CoG position through the operation using design value of the optical system and previously set the CoG position detecting area. Therefore, a time period used to detect the CoG position can be shortened in comparison with the first embodiment, and the wavefront aberration can be measured on the real-time basis.

In addition, the provisional CoG position Gt can be expressed with a function of the distance R from the center lens array to each lens array based upon the one-dimensional ray tracing result. Thus, the provisional CoG position can be two-dimensionally calculated with a simple calculation. In measuring the wavefront in which the rotationally symmetrical component is a major component, sufficient precision can be obtained only through the one-dimensional calculations.

Third Embodiment

Figure 10:
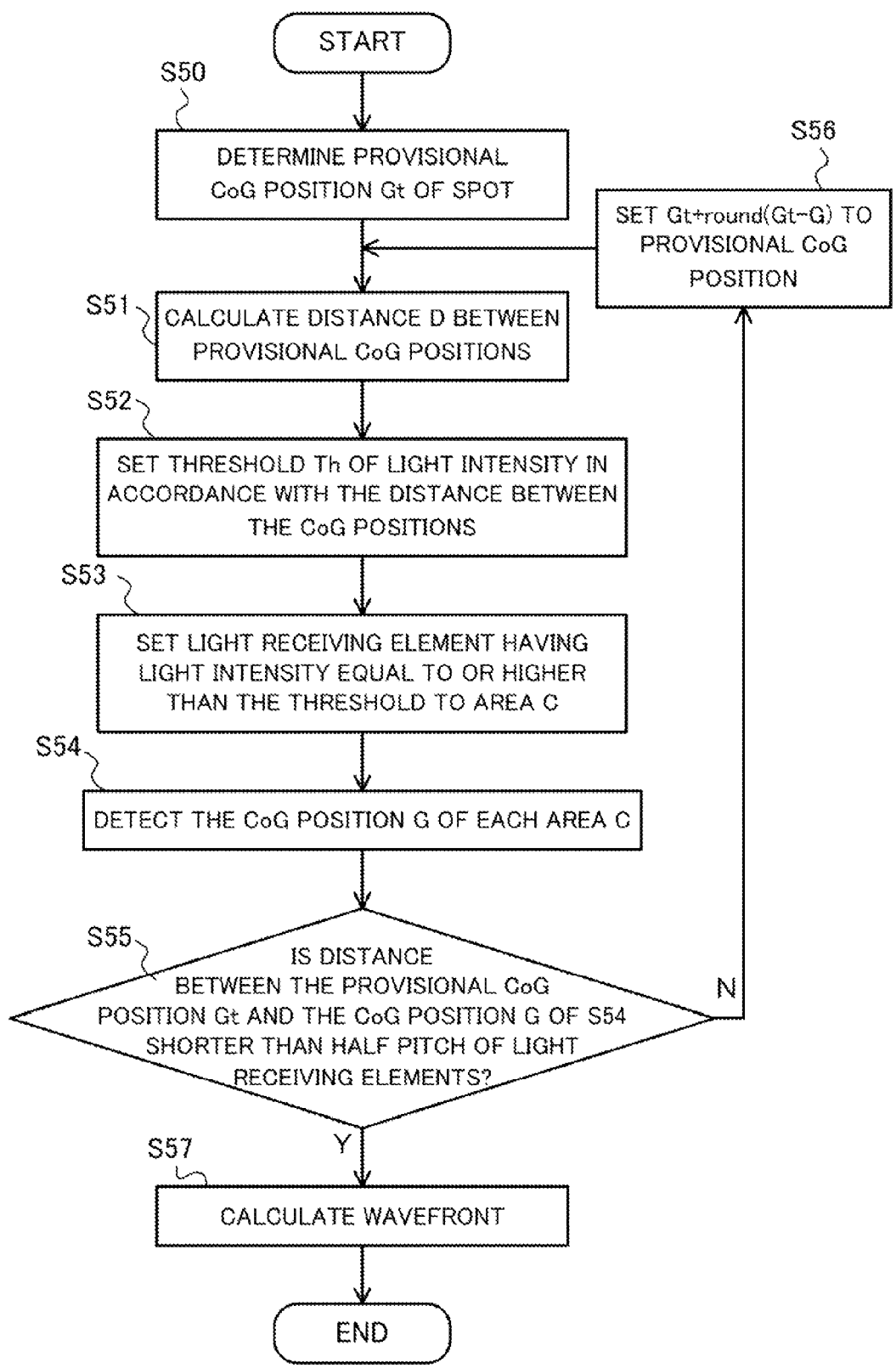
FIG. 10 is a flowchart of a wavefront measuring method according to a third embodiment of the present invention.

This embodiment sets a threshold of the light intensity for each spot in accordance with the distance between the CoG positions, and detects a CoG position of the area using the light receiving element 20 that has a light intensity equal to or higher than the threshold. FIG. 10 is a flowchart of a wavefront measuring method of this embodiment, which is executed by the analysis operator 3, and "S" stands for the step.

The step used to determining the provisional CoG position (S50) is performed as in S30 in the first embodiment or S40 and S41 in the second embodiment. The step S51 of calculating the distance between the provisional CoG positions is performed similar to the first and second embodiments.

Next, the analysis operator 3 sets a threshold Th(n, m) of the light intensity in accordance with the distance D between the provisional CoG positions calculated in S51 (S52). For example, the threshold Th(n, m) when the distance D between the provisional CoG positions is approximately equal to or higher than the pitch P of the micro lens array 1 may be set by a ratio between a main peak and a sub-peak of the condensed spot by the lens array. For example, when the lens array shape is rectangular, the threshold is set to about 4% of the light receiving element 20 that has the maximum intensity on the spot. In addition, the threshold Th(n, m) is set for the distance D between the provisional CoG positions of the pitch P or smaller. As the distance D between the provisional CoG positions reduces, the intensity information of the adjacent spot increases in detecting the CoG position. In order to reduce the influence of the adjacent spot, it is necessary to set a high threshold and to narrow the area C as in the first and second embodiments. Accordingly, in case of D<P, the threshold is set high in inverse proportion to the distance D between the CoG positions. In other words, when the distance D is a first value, a first threshold is set to the threshold of the light intensity for each spot, and when the distance D is a second value smaller than the first value, a second threshold larger than the first threshold is set to the threshold.

Next, the analysis operator 3 sets to the area C the light receiving element 20 that is equal to or higher than the threshold Th(n, m) determined in S52 in the spot having the distances Dx(n, m) and Dy(n, m) between the CoG positions with the provisional CoG position as a center (S53).

Next, the analysis operator 3 detects the CoG position using Expressions 1 and 2 in the area set by S53 (S54). S55 to S57 are similar to S34 to S36.

By setting the threshold in accordance with the intensity of each spot, the CoG corresponding to the uneven intensity can be detected in the light receiving sensor 2, as disclosed in Japanese Patent Laid-Open No. 11-211562. In addition, as disclosed in this embodiment, by adding the condition used to set the threshold using the distance between the CoG positions in each spot, the crosstalk can be reduced and the CoG position can be precisely detected with a wide dynamic range.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-179029, filed Aug. 10, 2012, which is hereby incorporated by reference herein in its entirety.

What is claimed is:

1. A wavefront measuring method of measuring a wavefront of a target optical system using a Shack-Hartmann sensor having a micro lens array and a plurality of light receiving elements, the micro lens array having a two-dimensional arrangement and including a plurality of micro lenses configured to condense light that has passed the target optical system upon the light receiving elements, the wavefront measuring method being performed by a processor and comprising the steps of:
   provisionally determining one of the plurality of light receiving elements as a center-of-gravity position in a spot having a light intensity distribution of light condensed on the light receiving element;
   calculating a distance between the provisionally determined center-of-gravity position and an adjacent center-of-gravity position;
   setting an area smaller than and inside of a spot that partially overlaps another spot, and setting a spot that does not overlap another spot to the area;
   calculating a center-of-gravity position for each area; and
   calculating the wavefront based upon a shift amount between an ideal center-of-gravity position when parallel light enters the micro lens array and the center-of-gravity position of each area.

2. The wavefront measuring method according to claim 1, wherein the provisionally determining step provisionally determines the light receiving element that has a maximum intensity at each spot as the center-of-gravity position.

3. The wavefront measuring method according to claim 1, wherein the provisionally determining step provisionally determines the center-of-gravity position using a design value of the target optical system and ray tracing.

4. The wavefront measuring method according to claim 1, wherein the setting step sets the area so that the areas of two partially overlapping spots do not overlap each other.

5. The wavefront measuring method according to claim 1, wherein the area set in each of partially overlapping spots has the distance or shorter.

6. The wavefront measuring method according to claim 5, wherein:
   the distance calculating step calculates the distance between the provisionally determined center-of-gravity position and the adjacent center-of-gravity position in a two-dimensional direction, and
   the area set in each of partially overlapping spots has the distance or shorter in a first direction of the two-dimensional direction and the distance or shorter in a second direction orthogonal to the first direction of the two-dimensional direction.

7. The wavefront measuring method according to claim 1, wherein the center-of-gravity position of each area shifts from a center of each area.

8. The wavefront measuring method according to claim 1, wherein:
   the wavefront calculating step is performed when a distance between the provisionally determined center-of-gravity position and a corresponding center-of-gravity position of each area is shorter than half a pitch of the light receiving elements,
   the wavefront measuring method further comprises the step of updating the provisionally determined center-of-gravity position with Gt+round(Gt−G) when the distance between the provisionally determined center-of-gravity position and the corresponding center-of-gravity position of each area is equal to or longer than half the pitch of the light receiving elements, where "G" is the corresponding center-of-gravity position for each area and "round" is rounding off of the first decimal place, and
   after the updating step, the distance calculating step or the area setting step is performed.

9. The wavefront measuring method according to claim 1, further comprising the step of setting a first threshold to a threshold of a light intensity for each spot when the distance is the first value, and of setting a second threshold larger than the first threshold to the threshold of the light intensity for each spot when the distance is a second value smaller than the first value, wherein the setting step sets the light receiving element having a light intensity equal to or higher than the threshold to the area.

10. A Shack-Hartmann sensor configured to measure a wavefront of a target optical system, the Shack-Hartmann sensor comprising:

a plurality of light receiving elements;

a micro lens array having a two-dimensional arrangement and including a plurality of micro lenses configured to condense light that has passed the target optical system upon the light receiving elements;

an analysis operator configured to:

provisionally determine one of the plurality of light receiving elements as a center-of-gravity position in a spot having a light intensity distribution of light condensed on the light receiving element;

calculate a distance between the provisionally determined center-of-gravity position and an adjacent center-of-gravity position;

set an area smaller than and inside of a spot that partially overlaps another spot, and setting a spot that does not overlap another spot to the area;

calculate a center-of-gravity position for each area; and calculate the wavefront based upon a shift amount between an ideal center-of-gravity position when parallel light enters the micro lens array and the center-of-gravity position of each area.

\* \* \* \* \*